United States Patent
Zhang et al.

(10) Patent No.: US 11,397,242 B1
(45) Date of Patent: Jul. 26, 2022

(54) 3D OBJECT DETECTION METHOD BASED ON MULTI-VIEW FEATURE FUSION OF 4D RADAR AND LIDAR POINT CLOUDS

(71) Applicant: Tsinghua University, Beijing (CN)

(72) Inventors: Xinyu Zhang, Beijing (CN); Jun Li, Beijing (CN); Li Wang, Beijing (CN); Jianxi Luo, Beijing (CN); Huaping Liu, Beijing (CN); Yuchao Liu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/566,709

(22) Filed: Dec. 31, 2021

(30) Foreign Application Priority Data

Feb. 23, 2021 (CN) .......................... 202110200544.2

(51) Int. Cl.
*G01S 7/41* (2006.01)
*G06V 10/80* (2022.01)
(Continued)

(52) U.S. Cl.
CPC .............. *G01S 7/417* (2013.01); *G01S 13/42* (2013.01); *G01S 13/865* (2013.01); *G01S 13/89* (2013.01);
(Continued)

(58) Field of Classification Search
CPC ...... G06V 20/56; G06V 10/82; G06V 20/588; G06V 10/40; G06V 30/1918;
(Continued)

(56) References Cited

U.S. PATENT DOCUMENTS 9,286,524 B1 * 3/2016 Mei .................... G06K 9/6256
11,062,454 B1 * 7/2021 Cohen .................. G01S 13/865
(Continued)

FOREIGN PATENT DOCUMENTS

| CN | 108509972 A | 9/2018 |
| CN | 111079685 A | 4/2020 |

(Continued)

OTHER PUBLICATIONS

Y. Zhang, Z. Xiang, C. Qiao and S. Chen, "Accurate and Real-Time Object Detection Based on Bird's Eye View on 3D Point Clouds,"2019 International Conference on 3D Vision (3DV), 2019, pp. 214-221, doi: 10.1109/3DV.2019.00032. (Year: 2019).*

(Continued)

*Primary Examiner* — Olumide Ajibade Akonai
(74) *Attorney, Agent, or Firm* — Bayramoglu Law Offices LLC

(57) ABSTRACT

A 3D object detection method based on multi-view feature fusion of 4D RaDAR and LiDAR point clouds includes simultaneously acquiring RaDAR point cloud data and LiDAR point cloud data; and inputting the RaDAR point cloud data and the lidar point cloud data into a pre-established and trained RaDAR and LiDAR fusion network and outputting a 3D object detection result, wherein the RaDAR and LiDAR fusion network is configured to learn interaction information of a LiDAR and a RaDAR from a bird's eye view and a perspective view, respectively, and concatenate the interaction information to achieve fusion of the RaDAR point cloud data and the lidar point cloud data. The method can combine advantages of RaDAR and LiDAR, while avoiding disadvantages of the two modalities as much as possible to obtain a better 3D object detection result.

20 Claims, 3 Drawing Sheets

(51) Int. Cl.
  *G06V 10/82*    (2022.01)
  *G06V 20/64*    (2022.01)
  *G01S 13/42*    (2006.01)
  *G06V 10/774*   (2022.01)
  *G01S 13/86*    (2006.01)
  *G01S 13/89*    (2006.01)
  *G06V 10/77*    (2022.01)

(52) U.S. Cl.
  CPC ........ *G06V 10/774* (2022.01); *G06V 10/7715* (2022.01); *G06V 10/806* (2022.01); *G06V 10/82* (2022.01); *G06V 20/64* (2022.01)

(58) Field of Classification Search
  CPC ...... G06V 30/2552; G06T 2207/20081; G06T 2207/10028; G06T 2207/10044; G06T 2200/04; G01S 17/931; G01S 17/89; G01S 13/931; G01S 13/867; G01S 13/865; G01S 7/417; G01S 17/894; G06N 3/0454; G06N 20/00; G06N 3/08
  See application file for complete search history.

(56) References Cited

U.S. PATENT DOCUMENTS

| | | | | |
|---|---|---|---|---|
| 11,164,363 | B2* | 11/2021 | Zhou | G06V 20/56 |
| 2019/0391235 | A1* | 12/2019 | Harrison | G01S 7/003 |
| 2020/0175315 | A1* | 6/2020 | Gowaikar | G05D 1/0257 |
| 2020/0202540 | A1* | 6/2020 | Wang | G06T 7/248 |
| 2021/0302992 | A1* | 9/2021 | Chen | G06N 3/0454 |
| 2022/0035376 | A1* | 2/2022 | Laddah | G06K 9/6276 |

FOREIGN PATENT DOCUMENTS

| | | |
|---|---|---|
| CN | 111179329 A | 5/2020 |
| CN | 111192295 A | 5/2020 |
| CN | 111352112 A | 6/2020 |
| CN | 111476242 A | 7/2020 |
| CN | 111860695 A | 10/2020 |
| CN | 112083441 A | 12/2020 |
| CN | 112101222 A | 12/2020 |
| CN | 112183393 A | 1/2021 |

OTHER PUBLICATIONS

B. Xu et al., "RPFA-Net: a 4D RaDAR Pillar Feature Attention Network for 3D Object Detection," 2021 IEEE International Intelligent Transportation Systems Conference (ITSC), 2021, pp. 3061-3066, doi: 10.1109/ITSC48978.2021.9564754. (Year: 2021).*
R. Barea et al., "Integrating State-of-the-Art CNNs for Multi-Sensor 3D Vehicle Detection in Real Autonomous Driving Environments ," 2019 IEEE Intelligent Transportation Systems Conference (ITSC), 2019, pp. 1425-1431, doi: 10.1109/ITSC.2019.8916973. (Year: 2019).*
A. Geiger, P. Lenz and R. Urtasun, "Are we ready for autonomous driving? The KITTI vision benchmark suite," 2012 IEEE Conference on Computer Vision and Pattern Recognition, 2012, pp. 3354-3361, doi: 10.1109/CVPR.2012.6248074. (Year: 2012).*
Li Chao, et al., Attention based object detection with radar-lidar fusion, Journal of Computer Applications, 2020, pp. 1-10.
Qianqian Bi, Research on Vehicle Detection and Tracking Algorithm for Urban Complex Environment, 2020, pp. 30-50.
Zhang Xinyu, et al., Deep multi-modal fusion in object detection for autonomous driving, CAAI Transactions on ntelligent Systems, 2020, pp. 758-771, vol. 15, No. 4.
Shuo Chang, et al., Spatial Attention Fusion for Obstacle Detection Using MmWave Radar and Vision Sensor, Sensors, 2020, pp. 1-21, vol. 20, No. 956.

* cited by examiner

3D OBJECT DETECTION METHOD BASED ON MULTI-VIEW FEATURE FUSION OF 4D RADAR AND LIDAR POINT CLOUDS

CROSS REFERENCE TO THE RELATED APPLICATIONS

This application is based upon and claims priority to Chinese Patent Application No. 202110200544.2, filed on Feb. 23, 2021, the entire contents of which are incorporated herein by reference.

TECHNICAL FIELD

The present invention relates to the field of automatic driving, and in particular to a 3D object detection method based on multi-view feature fusion of 4D RaDAR and LiDAR point clouds.

BACKGROUND

The four core technologies of autonomous driving are environment perception, precise localization, path planning, and actuation by wire. Environmental information is acquired by a camera, an ultrasonic RaDAR, a LiDAR, a RaDAR, an inertial navigation system and a global satellite navigation system, and a high-precision map is built for vehicle localization, thereby predicting conditions of surrounding static and dynamic scenes. Environmental perception information and vehicle localization information are fused to provide an input to an anomaly processing system, to generate path planning. Finally, in actuation by wire, steering control, drive control and brake control signals are sent to a decision system by trajectory tracking, and a specific drive program and an execution component in an execution layer executes instructions sent by a decision layer.

Currently, the key to autonomous driving is still environmental perception, such as obstacle detection, lane line detection, road information reading, map building and assisted positioning, and detection and identification of traffic participants (vehicles, pedestrians, animals, etc.). Main sensors are cameras, LiDARs and RaDARs. Cameras have the advantages of a low cost and mature development of 2D algorithms, and obvious disadvantages such as low adaptability to scenes with obvious changes in light illumination, and rainy, snowy and foggy weather, and bad functional performance in distance and speed measurements. LiDARs have the advantages of high-level distance measurement and resolution, good directionality, and high anti-interference ability, and the disadvantages of a high cost and influence by rainy, snowy and foggy weather. Advantages of RaDARs include strong environmental adaptability, all-weather and all-time working characteristics, strong ability of longitudinal object distance and speed detection, long-distance perception and detection, and high-precision measurement for both static and dynamic objects.

In typical 3D object detection methods, a point cloud is snowy, used as an input, and a directed 3D bounding box is generated for each detected object. These methods can be grouped into two main categories: region proposal methods and single-stage methods. In a region proposal method, several region proposals are provided indicating regions which contain objects, and then region features are extracted to determine a class label for each proposal. The single-stage method uses a single-stage network to directly predict a class probability and regress a 3D bounding box of an object, without region proposal generation and post-processing, and is faster in operation. Both methods localize a 3D bounding box by extracting features of point clouds and inputting the same to a network, so the number and precision of the point clouds on an object determine whether the object can be detected effectively. For example, in the range of more than 70 meters, a 16-line LiDAR often only irradiates a single beam of point cloud on the object, making it impossible to describe the class and size of the object. In rainy, snowy and foggy weather, the point cloud quality is further deteriorated as the LiDAR sensor is blocked by environmental factors such as raindrops and snowflakes. A RaDAR produces point clouds within 100 meters, does not attenuate with distance, and is less affected by rainy, snowy and foggy weather.

Most open-source datasets contain 3D RaDAR data. For example, the nuScenes dataset contains only about more than 100 3D RaDAR points, each containing horizontal position information and velocity information (x, y, v). The Astyx dataset used in the present invention has about more than 1000 4D RaDAR point clouds, each having 3D position information and velocity information (x, y, z, v). Compared to other datasets, Astyx is more suitable for extracting features using a 3D object detection algorithm and fusing them effectively with those of a LiDAR.

In summary, to achieve a perception system adapted to special weather and long-distance high-resolution detection, 4D RaDAR and LiDAR data need to be fused to perceive the surrounding environment. A LiDAR can provide high-precision point cloud data at a close distance due to high density and precision of point clouds thereof, but such data needs to be complemented by RaDAR data at a longer distance. However, the RaDAR data has low vertical accuracy and low point cloud density and high noise, and needs deep fusion with the lidar data at an eigenvalue extraction stage.

SUMMARY

The present invention aims to overcome the above technical shortcomings and provides a 3D object detection method based on multi-view feature fusion of 4D RaDAR and LiDAR point clouds, which can learn the correlation between two modalities and intra-modal correlation through multiple fields of view and an attention mechanism, and thereby extract more effective features.

To achieve the above object, Embodiment 1 of the present invention provides a 3D object detection method based on multi-view feature fusion of 4D RaDAR and LiDAR point clouds, the method including:

simultaneously acquiring RaDAR point cloud data and LiDAR point cloud data; and inputting the RaDAR point cloud data and LiDAR point cloud data into a pre-established and trained RaDAR and LiDAR fusion network and outputting a 3D object detection result, wherein the RaDAR and LiDAR fusion network is configured to learn interaction information of a LiDAR and a RaDAR from a bird's eye view and a perspective view, respectively, and concatenate the interaction information to achieve fusion of the RaDAR point cloud data and LiDAR point cloud data.

As an improvement of the above method, the RaDAR and LiDAR fusion network includes: a voxelization module, a feature fusion module, a RaDAR and LiDAR feature interaction module, a pseudo-image processing module, a 2D convolutional neural network, and a detection head;

the voxelization module is configured to voxelize the RaDAR point cloud data and LiDAR point cloud data in the bird's eye view, respectively, and output pillar features of the RaDAR point cloud data and pillar features of the lidar point cloud data; and voxelize the RaDAR point cloud data and the lidar point cloud data in a perspective view, respectively, and output pyramid features of the RaDAR point cloud data and pyramid features of the lidar point cloud data;

the feature fusion module is configured to concatenate the pillar features of the LiDAR point cloud data and the pyramid features of the RaDAR point cloud data, concatenate the pillar features of the RaDAR point cloud data and the pyramid features of the LiDAR point cloud data, and input the two types of stitched features into the RaDAR and LiDAR feature interaction module;

the RaDAR and LiDAR feature interaction module is configured to learn the interaction information of the LiDAR and the RaDAR from a bird's eye view, and learn the interaction information of the LiDAR and the RaDAR from a perspective view to obtain a LiDAR feature with RaDAR interaction information and a RaDAR feature with LiDAR interaction information; and concatenate the features in a channel dimension to obtain a feature F, which is input to the pseudo-image processing module;

the pseudo-image processing module is configured to encode, by location, the feature F output by the RaDAR and LiDAR feature interaction module into an x-y plane according to coordinates of each voxel generated in the voxelization module to form a 128-channel pseudo-image;

the 2D convolutional neural network is configured to extract multi-scale feature information from the 128-channel pseudo-image and output the same to the detection head; and the detection head is configured to process the feature output by the 2D convolutional neural network and output a object detection result.

As an improvement of the above method, the voxelization module includes a RaDAR point cloud data pillar feature extraction unit, a LiDAR point cloud data pillar feature extraction unit, a RaDAR point cloud data pyramid feature extraction unit, and a LiDAR point cloud data pyramid feature extraction unit;

the RaDAR point cloud data pillar feature extraction unit includes a first fully connected layer, a first bird's-eye view, a first fully connected layer and a first maximum pooling layer; the RaDAR point cloud data is dimensionally expanded to 64 dimensions through the first fully connected layer, and voxelized in the BEV field of view through the first bird's-eye view, and then enters the first fully connected layer and the first maximum pooling layer to output the pillar features of the RaDAR point cloud data;

the LiDAR point cloud data pillar feature extraction unit includes a second fully connected layer, a second bird's eye view, a second fully connected layer and a second maximum pooling layer; the LiDAR point cloud data is dimensionally expanded to 64 dimensions through the second fully connected layer, and voxelized in the BEV field of view through the second bird's eye view, and enters the second fully connected layer and the second maximum pooling layer to output the pillar features of the LiDAR point cloud data;

the RaDAR point cloud data pyramid feature extraction unit includes a third fully connected layer, a first perspective view, a third fully connected layer and a third maximum pooling layer; the RaDAR point cloud data is dimensionally expanded to 64 dimensions through the third fully connected layer, and voxelized in the PV view through the first perspective view, and enters the third fully connected layer and the third maximum pooling layer to output the pyramid features of the RaDAR point cloud data; and the LiDAR point cloud data pyramid feature extraction unit includes a fourth fully connected layer, a second perspective view, a fourth fully connected layer and a fourth maximum pooling layer; and the LiDAR point cloud data is dimensionally expanded to 64 dimensions through the fourth fully connected layer, and voxelized in the PV view through the second perspective view, and then enters the fourth fully connected layer and the fourth maximum pooling layer to output the pyramid features of the LiDAR point cloud data.

As an improvement of the above method, the RaDAR point cloud data pillar feature extraction unit is specifically implemented in the following process:

projecting the RaDAR point cloud data onto the x-y plane to form a grid of H×W, thereby dividing the same into H×W pillars of a volume of 0.16×0.16×4, wherein each point of an original 4D RaDAR point cloud has 4 dimensions (x,y,z,r), where (x, y, z) is 3D coordinates, and r is reflectivity; there are many points within each pillar, and each point is expanded to 10 dimensions $(x,y,z,x_c,y_c,z_c,x_p,y_p,z_p)$, which are calculated as:

$$\begin{cases} [x_c, y_c, z_c] = [x, y, z] - [x_m, y_m, z_m] \\ [x_p, y_p, z_p] = [x, y, z] - [x_g, y_g, z_g] \end{cases}$$

in the formula, $(x_c,y_c,z_c)$ is a deviation of a point within the pillar relative to a pillar central point, $(x_m,y_m,z_m)$ is pillar central point coordinates, $(x_p,y_p,z_p)$ is a deviation of the point relative to a grid central point, and $(x_g,y_g,z_g)$ is grid central point coordinate;

each frame of RaDAR point cloud data forms a tensor of dimensions $(D_p, N, P)$, where $D_p$ is dimensions of the point, $D_p=10$, N is the number of points sampled for each pillar, N=32, P=H×W; each pillar with more than N points is randomly downsampled, and each pillar with less than N points is filled with 0 values; and the tensor is the pillar feature of the RaDAR point cloud data.

As an improvement of the above method, the RaDAR point cloud data pyramid feature extraction unit is specifically implemented in the following process:

projecting the RaDAR point cloud data onto the x-y plane to form a grid of H×W, thereby dividing point clouds within a pyramid with a vertical angle θ of [−26°, 6°] and a horizontal angle φ of [−90, 90°] into H×W pyramids, wherein a maximum of N points are randomly sampled within each pyramid, and each pyramid with less than N points is filled with 0; and each frame of RaDAR point cloud data forms a tensor of dimensions $(D_L, N, P)$, where $D_L=4$, P is the number of pyramids H×W, N is the number of points within each pyramid, N=32, and the tensor is the pyramid feature of the RaDAR point cloud data.

As an improvement of the above-mentioned method, a specific implementation process of the feature fusion module is as follows:

concatenating the pillar feature from the LiDAR and the pyramid feature from the RaDAR to form a 14-dimensional feature vector $F_L$:

$$F_L = \text{Concat}(F_{Lpi}, F_{Rpy})$$

where $F_{Lpi}$ is the pillar feature from the LiDAR, and $F_{Rpy}$ is the pyramid feature from the RaDAR; and Concat represents a feature stitching operation;

concatenating the pillar feature from the RaDAR and the pyramid feature from the LiDAR to form a 14-dimensional feature vector $F_R$, $$F_R = \text{Concat}(F_{Rpi}, F_{Lpy})$$

where $F_{Rpi}$ is the pillar feature from the RaDAR, and $F_{Lpy}$ is the pyramid feature from the LiDAR; and inputting the feature vectors $F_L$ and $F_R$ into the RaDAR and LiDAR feature interaction module, respectively.

As an improvement of the above-mentioned method, a specific implementation process of the RaDAR and LiDAR feature interaction module is as follows:

expanding the feature vector $F_L$ into a 64-dimensional feature $F_{L_{64}}$ through an FC layer and a Maxpool layer, and performing a convolution operation to dimensionally reduce the feature $F_{L_{64}}$ to a 16-dimensional feature $F_{L_{16}}$:

$$F_{L_{64}} = \text{Maxpool}(\text{Linear}(F_L))$$

$$F_{L_{16}} = \text{Conv}(\text{Maxpool}(\text{Linear}(F_{L_{64}})))$$

expanding the feature vector $F_R$ into a 64-dimensional feature $F_{R_{64}}$ through a FC layer and a Maxpool layer, and performing a convolution operation to dimensionally reduce the feature $F_{R_{64}}$ to a 16-dimensional feature $F_{R_{16}}$:

$$F_{R_{64}} = \text{Maxpool}(\text{Linear}(F_R))$$

$$F_{R_{16}} \text{Conv}(\text{Maxpool}(\text{Linear}(F_{R_{64}})))$$

where Conv represents a convolutional layer, Maxpool represents a maximum pooling layer, and Linear represents a fully connected layer;

transposing the 16-dimensional feature $F_{L_{16}}$ and then multiplying the same with the 16-dimensional feature $F_{R_{16}}$, and performing a Softmax normalization operation to generate a weight matrix $F_{Lw}$ of size M×N:

$$F_{Lw} = \text{Sfot max}((F_{L_{16}})^T F_{R_{16}})$$

wherein in the formula, Softmax represents the normalization operation;

transposing the 16-dimensional feature $F_{R_{16}}$ and then multiplying the same with the 16-dimensional feature $F_{L_{16}}$, and performing a Softmax normalization operation to generate a weight matrix $F_{Rw}$ of size N×M:

$$F_{Rw} = \text{Sfotmax}((F_{R_{16}})^T F_{L_{16}})$$

multiplying the weight matrix $F_{Rw}$ with $F_{L_{64}}$ to obtain a new 64-dimensional feature vector, subtracting $F_{R_{64}}$ from the feature vector, and after processing by a linear layer, a normalization layer and an ReLU activation function, adding $F_{R_{64}}$ thereto, to obtain a RaDAR feature $F_{Rt}$ with LiDAR interaction information:

$$F_{Rt} = \text{ReLU}(BN(\text{linear}(F_{Rw}F_{L_{64}} - F_{R_{64}}))) + F_{R_{64}}$$

where ReLU is the activation function, BN is the normalization layer, and linear is the linear layer;

multiplying the weight matrix $F_{Lw}$ with the feature $F_{L_{64}}$, subtracting $F_{L_{64}}$ therefrom, and after processing by a linear layer, a normalization layer and an ReLU activation function, adding $F_{L_{64}}$ thereto, to obtain a LiDAR feature $F_{Lt}$ with RaDAR interaction information:

$$F_{Lt} = \text{ReLU}(BN(\text{linear}(F_{Lw}F_{R_{64}} - F_{L_{64}}))) + F_{L_{64}}$$

concatenating the features $F_{Rt}$ and $F_{Lt}$ of the two modalities by dimensions to accomplish an interaction of the two modalities:

$$F = \text{Conca}(tF_{Rt}, F_{Lt})$$

wherein in the formula, F is a concatenated feature, and Concat represents a concatenating operation.

As an improvement of the above method, the method further includes a step of training the RaDAR and LiDAR fusion network, specifically including:

normalizing an Astyx dataset used here to the format of a standard KITTI dataset, and aligning the LiDAR data and a 3D bounding box to a RaDAR coordinate system by using a calibration file to generate a training set; and training the RaDAR and LiDAR fusion network by using the training set to obtain a trained RaDAR and LiDAR fusion network.

Embodiment 2 of the present invention provides a terminal device, including a memory, a processor, and a computer program stored in the memory and executable on the processor, wherein the processor, when executing the computer program, implements the above method.

Embodiment 3 of the present invention provides a storage medium, including a memory, a processor, and a computer program stored in the memory and executable by the processor, wherein when executing the computer program, the processor executes the above method.

The present invention has the following advantages:

The 3D object detection method based on 4D RaDAR and LiDAR point cloud multi-view feature fusion of the present invention is intended to combine advantages of RaDAR and LiDAR, while avoiding disadvantages of the two modalities as much as possible to obtain a better 3D object detection result.

BRIEF DESCRIPTION OF THE DRAWINGS

To more clearly describe the present invention, drawings for using in the present invention will be introduced briefly below. Obviously, the drawings in the following description illustrate some embodiments of the present invention, and for some embodiments of the present invention, other drawings may also be obtained by those of ordinary skill in the art based on these drawings without creative work.

DETAILED DESCRIPTION OF THE EMBODIMENTS

To make the objectives, technical solutions and advantages of the present invention clearer and more apparent, the present invention will be further described in detail below in conjunction with the accompanying drawings and embodiments. It should be understood that the specific embodiments described herein are only used for explaining the present invention, rather than limiting the present invention.

Figure 1:
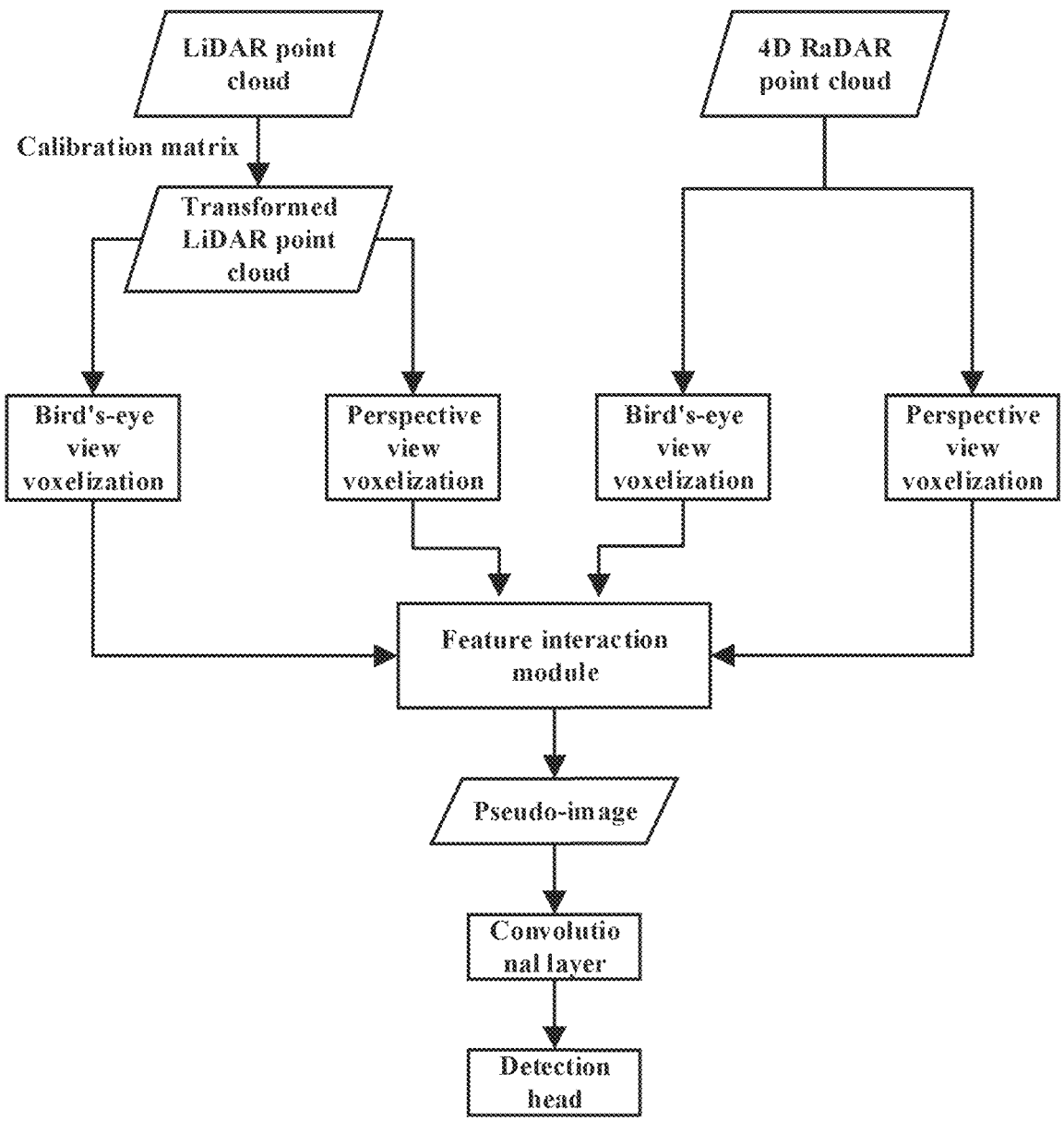
FIG. 1 is a flow diagram of a 3D object detection method based on 4D RaDAR and LiDAR point cloud multi-view feature fusion provided in Embodiment 1 of the present invention.

As shown in FIG. 1, Embodiment 1 of the present invention provides a 3D object detection method based on multi-view feature fusion of 4D RaDAR and LiDAR point clouds, the method including the following steps:

Step 1) simultaneously acquiring RaDAR point clouds and LiDAR point clouds.

Step 2) reading the radar point clouds and the LiDAR point clouds and voxelizing the two types of point clouds in a BEV field of view, respectively, projecting the point clouds onto an x-y plane to form a grid of H×W, and dividing the same into H×W pillars of a volume of 0.16×0.16×4(m).

There are many point clouds within each pillar, and an original point cloud data point has 4 dimensions (x, y, z, r), where r represents reflectivity; and the point cloud is expanded to 10 dimensions, which are calculated according to formula (1) $(x, y, z, x_c, y_c, z_c, x_p, y_p, z_p)$ $$\begin{cases} [x_c, y_c, z_c] = [x, y, z] - [x_m, y_m, z_m] \\ [x_p, y_p, z_p] = [x, y, z] - [x_g, y_g, z_g] \end{cases} \quad (1)$$

In the formula, $(x_c, y_c, z_c)$ is a deviation of each point cloud within the pillar relative to a pillar central point, $(x_m, y_m, z_m)$ is pillar central point coordinates, $(x_p, y_p, z_p)$ is a deviation of each point cloud relative to a grid central point, and $(x_g, y_g, z_g)$ is grid central point coordinate. Each column with more than N points is randomly downsampled, and each column with less than N points is filled with 0. Hence, a tensor of dimensions (D, P, N) is formed, where D is 10, N is the number of samples for each pillar, which is 32, and P is the total number of pillars H×W.

Step 3) reading the RaDAR point clouds and the LiDAR point clouds and voxelizing the two types of point clouds in a PV view, respectively, and dividing point clouds within a pyramid with a vertical angle θ of [−26°, 6°] and a horizontal angle φ of [−90°, 90°] into H×W small pyramids.

A maximum of 32 points are randomly sampled within each pyramid, and each pyramid with less than 32 points is filled with 0. Each frame of point cloud is also processed to form a tensor of dimensions (D, P, N), and points in each pyramid are not processed like those in each pillar, so D is 4, P is the number of pyramids, which is H×W, and N is the number of points in each pyramid, which is 32.

Step 4) after the point clouds are processed into low-latitude features by pillar and pyramid methods, concatenating a pillar feature of a LiDAR and a pyramid feature of a radar, and concatenating a pillar feature of the radar and a pyramid feature of a LiDAR to form two 14-dimensional feature vectors, respectively:

$$\begin{cases} F_L = Concat(F_{Lpi}, F_{Rpy}) \\ F_R = Concat(F_{Rpi}, F_{Lpy}) \end{cases} \quad (2)$$

In the formula, $F_{Lpi}$ is the pillar feature of the LiDAR, $F_{Rpy}$ is the pyramid feature of the radar, $F_{Rpi}$ is the pillar feature of the radar, $F_{Lpy}$ is the pyramid feature of the LiDAR, $F_L$ is a feature formed by adding $L_{Lpi}$ and $F_{Rpy}$, and $F_R$ is a feature formed by adding $F_{Rpi}$ and $F_{Lpi}$, and Concat represents a feature concatenating operation.

Figure 2:
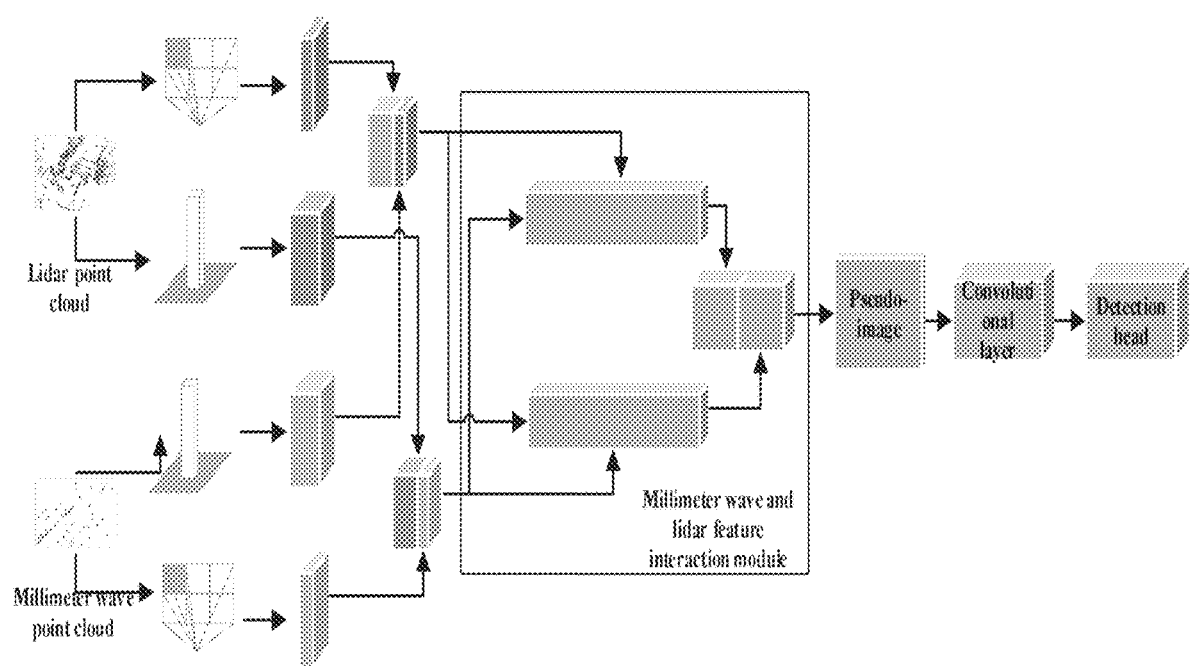
FIG. 2 is a schematic diagram of the structure of a RaDAR and LiDAR fusion network provided in Embodiment 1 of the present invention.

FIG. 2 shows a RaDAR and LiDAR fusion network structure.

Step 5) inputting the two 14-dimensional features obtained in step 4) into the RaDAR and LiDAR feature interaction module interRAL, respectively.

Figure 3:
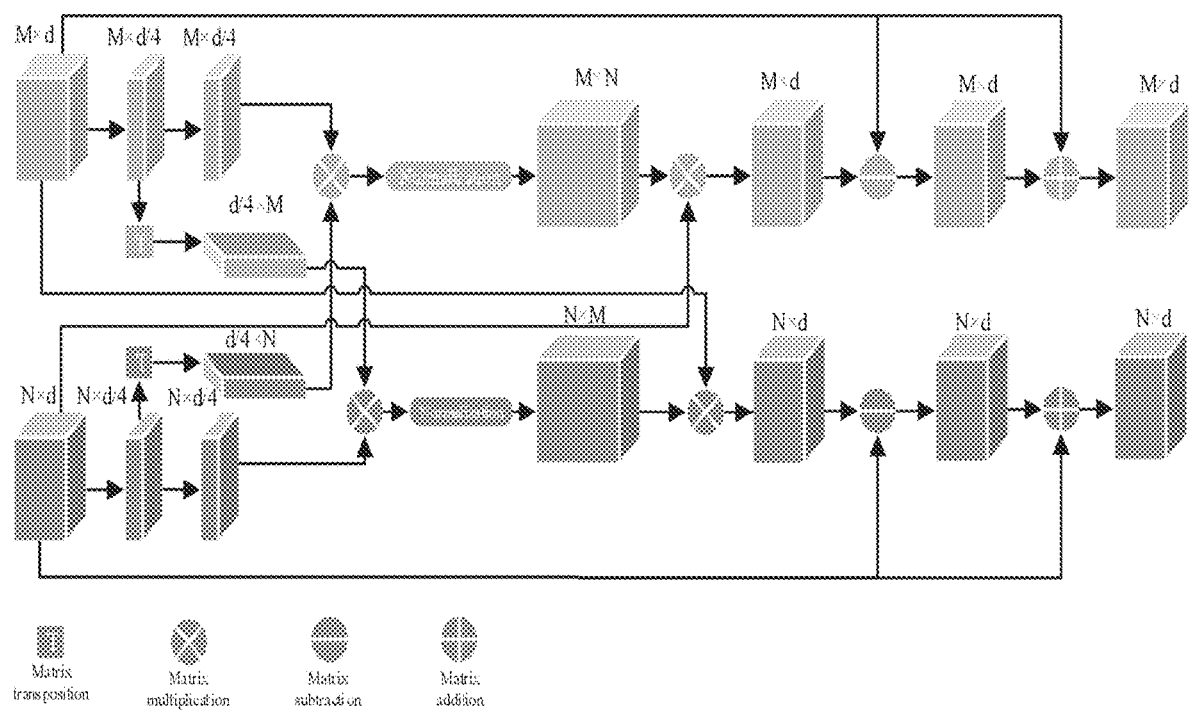
FIG. 3 is a structure diagram of a RaDAR and LiDAR feature interaction module (interRAL) provided in Embodiment 1 of the present invention.

As shown in FIG. 3, interRAL uses a self-attention mechanism, in which after transposed feature matrices are introduced between two modalities, the correlation between the modalities is learned from the other modalities, and more effective features are selected in the process.

Specific steps of network implementation are as follows:

1) expanding the 14-dimensional feature of the LiDAR point cloud into a 64-dimensional feature through an FC layer and a Maxpool layer, and performing a convolution operation to dimensionally reduce the feature to form a 16-dimensional feature, and expanding the 14-dimensional feature of the radar point cloud into a 64-dimensional feature through an FC layer and a Maxpool layer, and performing a convolution operation to dimensionally reduce the feature to form a 16-dimensional feature:

$$\begin{cases} F_{L_{64}} = Maxpool(Linear(F_L)) \\ F_{R_{64}} = Maxpool(Linear(F_R)) \end{cases} \quad (3)$$

$$\begin{cases} F_{L_{16}} = Conv(Maxpool(Linear(F_L))) \\ F_{R_{16}} = Conv(Maxpool(Linear(F_R))) \end{cases} \quad (4)$$

In the formula, $F_{L_{64}}$ and $F_{R_{64}}$ are features formed by expanding $F_L$ and $F_R$ to 64 dimensions, respectively, and $F_{L_{16}}$ and $F_{R_{16}}$ are features formed by dimensionally reducing $F_L$ and $F_R$ to 16 dimensions, respectively, Conv represents a convolutional layer, Maxpool represents a maximum pooling layer, and Linear represents a fully connected layer;

2) transposing the 16-dimensional feature of each modality and then multiplying the same with the 16-dimensional feature of the other modality, and performing a Softmax normalization operation to generate weight matrices of size M×N and N×M, respectively:

$$\begin{cases} F_{Lw} = Sfotmax((F_{L_{16}})^T F_{R_{16}}) \\ F_{Rw} = Sfotmax((F_{R_{16}})^T F_{L_{16}}) \end{cases} \quad (5)$$

In the formula, $F_{Lw}$ is the weight matrix generated by multiplying a transpose of $F_{L_{16}}$ with $F_{R_{16}}$, and $F_{Rw}$ is the weight matrix generated by multiplying a transpose of $F_{R_{16}}$ with $F_{L_{16}}$, and Softmax represents the normalization operation;

3) multiplying $F_{Lw}$ with $F_{Rw}$ to obtain a new 64-dimensional feature vector, subtracting $F_{R_{64}}$ from the feature vector, and after processing by a linear layer, a normalization layer and an activation function, adding $F_{R_{64}}$ thereto, and finally concatenating the features of the two modalities by dimensions to accomplish an interaction of the two modalities:

$$\begin{cases} F_{Rt} = ReLU(BN(linear(F_{Rw}F_{L_{64}} - F_{R_{64}}))) + F_{R_{64}} \\ F_{Lt} = ReLU(BN(linear(F_{Lw}F_{R_{64}} - F_{L_{64}}))) + F_{L_{64}} \end{cases} \quad (6)$$

$$F = Concat(F_{Rt}, F_{Lt}) \quad (7)$$

In the formula, $F_{Rt}$ is a RaDAR feature with LiDAR interaction information, $F_{Lt}$ is a LiDAR feature with a radar interaction information, F is a concatenated feature, ReLU is the activation function, BN is the normalization layer, linear is the linear layer, and Concat represents a concatenating operation.

Step 6) encoding the interacted features F into the x-y plane according to coordinates of each voxel retained previously during voxelization, to form a 128-channel pseudo-image.

Step 7) inputting the 128-channel pseudo-image into a 2D convolutional neural network (2DCNN) for further feature extraction, wherein the 2DCNN uses a mature pyramidal structure CNN to extract multi-scale feature information.

Step 8) inputting features output from the 2DCNN to a detection head, and outputting an object detection result, wherein the detection head uses is a mature RPN Head.

An Astyx dataset used in the present invention is normalize to the format of a standard KITTI dataset, and the LiDAR data is aligned to a RaDAR coordinate system by using a calibration file; and the RaDAR and LiDAR fusion network is trained.

Embodiment 2

Embodiment 2 of the present invention may also provide a computer device, including a processor, a memory, at least one network interface and a user interface. Components of the device are coupled together via a bus system. It may be understood that the bus system is configured to implement connection and communication between these components. The bus system includes a power bus, a control bus, and a status signal bus in addition to a data bus.

The user interface may include a display, a keyboard, or a clicking device (e.g., a mouse, a track ball, a touch pad, or a touch screen).

It may be understood that the memory in embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM) or a flash memory. The volatile memory may be random access memory (RAM), which is used as an external cache. By way of exemplary but not restrictive description, many forms of RAMs may be used, such as a static RAM (SRAM), a dynamic RAM (DRAM), a synchronous DRAM (SDRAM), a double data rate SDRAM (DDRSDRAM), an enhanced SDRAM (ES-DRAM), a Synchlink DRAM (SLDRAM), and a direct Rambus RAM (DRRAM). The memory described herein is intended to include, but is not limited to, these and any other suitable types of memory.

In some implementations, the memory stores the following elements, executable modules or data structures, or a subset thereof, or an extended set thereof: an operating system and an application.

The operating system contains various system programs, such as a framework layer, a core library layer, and a driver layer, for implementing various basic services and performing hardware-based tasks. The application contains various applications, such as a media player, and a browser, for implementing various application services. A program for implementing the method of embodiments of the present disclosure may be included in the application.

In the above embodiments, by calling a program or instructions stored in the memory, which may specifically be a program or instructions stored in the application, the processor is configured to:

execute the steps of the method of Embodiment 1.

The method of Embodiment 1 may be applied in the processor or implemented by the processor. The processor may be an integrated circuit chip with signal processing capability. During implementation, the steps of the above-mentioned method may be accomplished by an integrated logic circuit in the form of hardware or instructions in the form of software in the processor. The above-mentioned processor may be a general-purpose processor, a digital signal processor (DSP), an application specific integrated circuit (ASIC), a field programmable gate array (FPGA) or other programmable logic device, a discrete gate or transistor logic device, or a discrete hardware component. The various methods, steps and logical block diagrams disclosed in Embodiment 1 may be implemented or executed. The general-purpose processor may be a microprocessor, or the processor may also be any conventional processor or the like. The steps of the method disclosed in conjunction with Embodiment 1 may be directly embodied in hardware and executed by a decoding processor, or executed by a combination of hardware and software modules in a decoding processor. The software module may be in a storage medium mature in the art, such as a random memory, a flash memory, a read-only memory, a programmable read-only memory or electrically erasable programmable memory, or a register. The storage medium is in the memory, and the processor reads information in the memory and accomplishes the steps of the above-mentioned method in conjunction with hardware thereof.

It may be understood that these embodiments described in the present invention may be implemented with hardware, software, firmware, middleware, microcodes, or a combination thereof. For hardware implementation, the processing unit may be implemented in one or more application specific integrated circuits (ASICs), digital signal processors (DSPs), digital signal processing devices (DSP Devices, DSPDs), programmable logic devices (PLDs), field-programmable gate arrays (FPGAs), general-purpose processors, controllers, microprocessors, microcontrollers, other electronic units for performing the functions described in the present application, or a combination thereof.

For software implementation, the technology of the present invention may be implemented by executing functional modules (e.g. processes, and functions) of the present invention. Software codes may be stored in the memory and executed by the processor. The memory may be implemented in the processor or outside the processor.

Embodiment 3

Embodiment 3 of the present invention provides a non-volatile storage medium configured to store a computer program. When the computer program is executed by the processor, the steps in the method in embodiment 1 may be implemented.

Finally, it should be noted that the above embodiments are only used for describing instead of limiting the technical solutions of the present invention. Although the present invention is described in detail with reference to the embodiments, persons of ordinary skill in the art should understand that modifications or equivalent substitutions of the technical solutions of the present invention should be encompassed within the scope of the claims of the present invention so long as they do not depart from the spirit and scope of the technical solutions of the present invention.

What is claimed is:

1. A 3D object detection method based on a multi-view feature fusion of 4D RaDAR and LiDAR point clouds, comprising:

simultaneously acquiring RaDAR point cloud data and LiDAR point cloud data; and inputting the RaDAR point cloud data and the LiDAR point cloud data into a pre-established and trained RaDAR and LiDAR fusion network and outputting a 3D object detection result, wherein the pre-established and trained RaDAR and LiDAR fusion network is configured to learn interaction information of a LiDAR and a RaDAR from a bird's eye view (ABBR. BEV) and a perspective view (ABBR. PV), respectively, and concatenate the interaction information to achieve a fusion of the RaDAR point cloud data and the LiDAR point cloud data;

wherein the pre-established and trained RaDAR and LiDAR fusion network comprises: a voxelization module, a feature fusion module, a RaDAR and LiDAR feature interaction module, a pseudo-image processing module, a 2D convolutional neural network, and a detection head;

the voxelization module is configured to voxelize the RaDAR point cloud data and LiDAR point cloud data in the bird's eye view, respectively, and output pillar features of the RaDAR point cloud data and pillar features of the LiDAR point cloud data; and voxelize the RaDAR point cloud data and the LiDAR point cloud data in the perspective view, respectively, and output pyramid features of the RaDAR point cloud data and pyramid features of the LiDAR point cloud data;

the feature fusion module is configured to concatenate the pillar features of the LiDAR point cloud data and the pyramid features of the RaDAR point cloud data, concatenate the pillar features of the RaDAR point cloud data and the pyramid features of the LiDAR point cloud data, and input two types of stitched features into the RaDAR and LiDAR feature interaction module;

the RaDAR and LiDAR feature interaction module is configured to learn the interaction information of the LiDAR and the RaDAR from the bird's eye view, and learn the interaction information of the LiDAR and the RaDAR from the perspective view to obtain a LiDAR feature with RaDAR interaction information and a RaDAR feature with LiDAR interaction information; and concatenate the LiDAR feature and the RaDAR feature in a channel dimension to obtain a feature F, the feature F is input to the pseudo-image processing module;

the pseudo-image processing module is configured to encode, by a location, the feature F output by the RaDAR and LiDAR feature interaction module into an x-y plane according to a coordinate of each voxel generated in the voxelization module to form a 128-channel pseudo-image;

the 2D convolutional neural network is configured to extract multi-scale feature information from the 128-channel pseudo-image and output the multi-scale feature information to the detection head; and the detection head is configured to process the multi-scale feature information output by the 2D convolutional neural network and output an object detection result.

2. The 3D object detection method based on the multi-view feature fusion of the 4D RaDAR and LiDAR point clouds according to claim 1, wherein the voxelization module comprises a RaDAR point cloud data pillar feature extraction unit, a LiDAR point cloud data pillar feature extraction unit, a RaDAR point cloud data pyramid feature extraction unit, and a LiDAR point cloud data pyramid feature extraction unit;

the RaDAR point cloud data pillar feature extraction unit comprises two first fully connected layers, a first bird's-eye view and a first maximum pooling layer; the RaDAR point cloud data is dimensionally expanded to 64 dimensions through the one of the two first fully connected layers, and voxelized in the bird's eye view through the first bird's-eye view, and then enters the other of the two first fully connected layers and the first maximum pooling layer to output the pillar features of the RaDAR point cloud data;

the LiDAR point cloud data pillar feature extraction unit comprises two second fully connected layers, a second bird's eye view and a second maximum pooling layer; the LiDAR point cloud data is dimensionally expanded to 64 dimensions through the one of the two second fully connected layers, and voxelized in the bird's eye view through the second bird's eye view, and enters the other of the two second fully connected layers and the second maximum pooling layer to output the pillar features of the LiDAR point cloud data;

the RaDAR point cloud data pyramid feature extraction unit comprises two third fully connected layers, a first perspective view and a third maximum pooling layer; the RaDAR point cloud data is dimensionally expanded to 64 dimensions through the one of the two third fully connected layers, and voxelized in the perspective view through the first perspective view, and enters the other of the two third fully connected layers and the third maximum pooling layer to output the pyramid features of the RaDAR point cloud data; and the LiDAR point cloud data pyramid feature extraction unit comprises two fourth fully connected layers, a second perspective view and a fourth maximum pooling layer; and the LiDAR point cloud data is dimensionally expanded to 64 dimensions through the one of the two fourth fully connected layers, and voxelized in the perspective view through the second perspective view, and then enters the other of the two fourth fully connected layers and the fourth maximum pooling layer to output the pyramid features of the LiDAR point cloud data.

3. The 3D object detection method based on the multi-view feature fusion of the 4D RaDAR and LiDAR point clouds according to claim 2, wherein the RaDAR point cloud data pillar feature extraction unit is specifically implemented in the following process:

projecting the RaDAR point cloud data onto the x-y plane to form a grid of H×W, and dividing the RaDAR point cloud data into H×W pillars of a volume of 0.16×0.16×4, wherein each point of an original 4D RaDAR point cloud has 4 dimensions (x, y, z, r), where (x, y, z) is a 3D coordinate, and r is reflectivity; a plurality of points are within each of the H×W pillars, and each of the plurality of points is expanded to 10 dimensions (x,y,z,$x_c$,$y_c$,$z_c$,$x_p$,$y_p$,$z_p$, r), calculated as:

$$\begin{cases} [x_c, y_c, z_c] = [x, y, z] - [x_m, y_m, z_m] \\ [x_p, y_p, z_p] = [x, y, z] - [x_g, y_g, z_g] \end{cases}$$

in the formula, ($x_c$,$y_c$,$z_c$) is a deviation of a point of the plurality of points within a pillar of the H×W pillars relative to a pillar central point, ($x_m$,$y_m$,$z_m$) is a pillar central point coordinate, ($x_p$,$y_p$,$z_p$) is a deviation of the point relative to a grid central point, and ($x_g$,$y_g$,$z_g$) is a grid central point coordinate;

each frame of the RaDAR point cloud data forms a tensor of dimensions $(D_p,N,P)$, where $D_p$ is dimensions of the point, $D_p=10$, N is a number of points sampled for each of the H×W pillars, N=32, P=H×W; each of the H×W pillars with more than N points is randomly downsampled, and each of the H×W pillars with less than N points is filled with a 0 value; and the tensor is the pillar features of the RaDAR point cloud data.

4. The 3D object detection method based on the multi-view feature fusion of the 4D RaDAR and LiDAR point clouds according to claim 3, wherein the RaDAR point cloud data pyramid feature extraction unit is specifically implemented in the following process:

projecting the RaDAR point cloud data onto the x-y plane to form a grid of H×W, thereby dividing point clouds within a pyramid with a vertical angle θ of [−26°, 6°] and a horizontal angle φ of [−90°, 90°] into H×W pyramids, wherein a maximum of N points are randomly sampled within each of the H×W pyramids, and each of the H×W pyramids with less than the N points is filled with 0; and each frame of the RaDAR point cloud data forms a tensor of dimensions $(D_L,N,P)$, where $D_L=4$, P is a number of the H×W pyramids H×W, N is a number of the N points within each of the H×W pyramids, N=32, and the tensor is the pyramid features of the RaDAR point cloud data.

5. The 3D object detection method based on the multi-view feature fusion of the 4D RaDAR and LiDAR point clouds according to claim 4, wherein the feature fusion module is specifically implemented in the following process:

concatenating the pillar features from the LiDAR and the pyramid features from the RaDAR to form a 14-dimensional feature vector $F_L$:

$$F_L=\text{Concat}(F_{Lpi},F_{Rpy})$$

where $F_{Lpi}$ are the pillar features from the LiDAR, and $F_{Rpy}$ are the pyramid features from the RaDAR; and Concat represents a feature stitching operation;

concatenating the pillar features from the RaDAR and the pyramid features from the LiDAR to form a 14-dimensional feature vector $F_R$, $$F_R=\text{Concat}(F_{Rpi},F_{Lpy})$$

where $F_{Rpi}$ are the pillar features from the RaDAR, and $F_{Lpy}$ are the pyramid features from the LiDAR; and inputting the 14-dimensional feature vector $F_L$ and the 14-dimensional feature vector $F_R$ into the RaDAR and LiDAR feature interaction module, respectively.

6. The 3D object detection method based on the multi-view feature fusion of the 4D RaDAR and LiDAR point clouds according to claim 5, wherein the RaDAR and LiDAR feature interaction module is specifically implemented in the following process:

expanding the 14-dimensional feature vector $F_L$ into a 64-dimensional feature $F_{L_{64}}$ through an FC layer and a Maxpool layer, and performing a convolution operation to dimensionally reduce the 64-dimensional feature $F_{L_{64}}$ to a 16-dimensional feature $F_{L_{16}}$:

$$F_{L_{64}}=\text{Maxpool}(\text{Linear}(F_L))$$

$$F_{L_{16}}=\text{Conv}(\text{Maxpool}(\text{Linear}(F_{L_{64}})))$$

expanding the 14-dimensional feature vector $F_R$ into a 64-dimensional feature $F_{R_{64}}$ through an FC layer and a Maxpool layer, and performing the convolution operation to dimensionally reduce the 64-dimensional feature $F_{R_{64}}$ to a 16-dimensional feature $F_{R_{16}}$:

$$F_{R_{64}}=\text{Maxpool}(\text{Linear}(F_R))$$

$$F_{R_{16}}=\text{Conv}(\text{Maxpool}(\text{Linear}(F_{R_{64}})))$$

where Conv represents a convolutional layer, Maxpool represents a maximum pooling layer, and Linear represents a fully connected layer;

transposing the 16-dimensional feature $F_{L_{16}}$ and then multiplying the 16-dimensional feature $F_{L_{16}}$ with the 16-dimensional feature $F_{R_{16}}$, and performing a Softmax normalization operation to generate a weight matrix $F_{Lw}$ of a size M×N:

$$F_{Lw}=\text{Sfot max}((F_{L_{16}})^T F_{R_{16}})$$

wherein in the formula, Softmax represents the normalization operation;

transposing the 16-dimensional feature $F_{R_{16}}$ and then multiplying the 16-dimensional feature $F_{R_{16}}$ with the 16-dimensional feature $F_{L_{16}}$, and performing the Softmax normalization operation to generate a weight matrix $F_{Rw}$ of a size N×M:

$$F_{Rw}=\text{Sfotmax}((F_{R_{16}})^T F_{L_{16}})$$

multiplying the weight matrix $F_{Rw}$ with the weight matrix $F_{L_{64}}$ to obtain a new 64-dimensional feature vector, subtracting $F_{R_{64}}$ and after processing by a linear layer, a normalization layer and an ReLU activation function, adding $F_{R_{64}}$ thereto, to obtain the RaDAR feature $F_{Rt}$ with the LiDAR interaction information:

$$F_{Rt}=\text{ReLU}(BN(\text{linear}(F_{Rw}F_{L_{64}}-F_{R_{64}})))+F_{R_{64}}$$

where ReLU is the activation function, BN is the normalization layer, and linear is the linear layer;

multiplying the weight matrix $F_{Lw}$ with the feature $F_{R_{64}}$, subtracting $F_{L_{64}}$ therefrom, and after processing by the linear layer, the normalization layer and the activation function ReLU, adding $F_{L_{64}}$ thereto, to obtain the LiDAR feature $F_{Lt}$ with the RaDAR interaction information:

$$F_{Lt}=\text{ReLU}(BN(\text{linear}(F_{Lw}F_{R_{64}}-F_{L_{64}})))+F_{L_{64}}$$

concatenating the features $F_{Rt}$ and $F_{Lt}$ of two modalities by dimensions to accomplish an interaction of the two modalities:

$$F=\text{Concat}(F_{Rt},F_{Lt})$$

wherein in the formula, F is a concatenated feature, and Concat represents a concatenating operation.

7. The 3D object detection method based on the multi-view feature fusion of the 4D RaDAR and LiDAR point clouds according to claim 1, wherein the method further comprises a step of training a RaDAR and LiDAR fusion network, specifically comprising:

normalizing an Astyx dataset used to a format of a standard KITTI dataset, and aligning the LiDAR point cloud data and a 3D bounding box to a RaDAR coordinate system by using a calibration file to generate a training set; and training the RaDAR and LiDAR fusion network by using the training set to obtain a trained RaDAR and LiDAR fusion network.

8. A terminal device, comprising a memory, a processor, and a computer program stored in the memory and operable on the processor, wherein when executing the computer program, the processor implements the method of claim 1.

9. A non-volatile storage medium, configured to store a computer program, wherein when executing the computer program, a processor implements the method of claim 1.

10. The terminal device according to claim 8, wherein the method, wherein the voxelization module comprises a RaDAR point cloud data pillar feature extraction unit, a LiDAR point cloud data pillar feature extraction unit, a RaDAR point cloud data pyramid feature extraction unit, and a LiDAR point cloud data pyramid feature extraction unit;

the RaDAR point cloud data pillar feature extraction unit comprises two first fully connected layers, a first bird's-eye view and a first maximum pooling layer; the RaDAR point cloud data is dimensionally expanded to 64 dimensions through the one of the two first fully connected layers, and voxelized in the bird's eye view through the first bird's-eye view, and then enters the other of the two first fully connected layers and the first maximum pooling layer to output the pillar features of the RaDAR point cloud data;

the LiDAR point cloud data pillar feature extraction unit comprises two second fully connected layers, a second bird's eye view and a second maximum pooling layer; the LiDAR point cloud data is dimensionally expanded to 64 dimensions through the one of the two second fully connected layers, and voxelized in the bird's eye view through the second bird's eye view, and enters the other of the two second fully connected layers and the second maximum pooling layer to output the pillar features of the LiDAR point cloud data;

the RaDAR point cloud data pyramid feature extraction unit comprises two third fully connected layers, a first perspective view and a third maximum pooling layer; the RaDAR point cloud data is dimensionally expanded to 64 dimensions through the one of the two third fully connected layers, and voxelized in the perspective view through the first perspective view, and enters the other of the two third fully connected layers and the third maximum pooling layer to output the pyramid features of the RaDAR point cloud data; and the LiDAR point cloud data pyramid feature extraction unit comprises two fourth fully connected layers, a second perspective view and a fourth maximum pooling layer; and the LiDAR point cloud data is dimensionally expanded to 64 dimensions through the one of the two fourth fully connected layers, and voxelized in the perspective view through the second perspective view, and then enters the other of the two fourth fully connected layers and the fourth maximum pooling layer to output the pyramid features of the LiDAR point cloud data.

11. The terminal device according to claim 10, wherein the method, wherein the RaDAR point cloud data pillar feature extraction unit is specifically implemented in the following process:

projecting the RaDAR point cloud data onto the x-y plane to form a grid of H×W, and dividing the RaDAR point cloud data into H×W pillars of a volume of 0.16×0.16×4, wherein each point of an original 4D RaDAR point cloud has 4 dimensions (x, y, z, r), where (x, y, z) is a 3D coordinate, and r is reflectivity; a plurality of points are within each of the H×W pillars, and each of the plurality of points is expanded to 10 dimensions (x,y, z,$x_c$,$y_c$,$z_c$,$x_p$,$y_p$,$z_p$, r), calculated as:

$$\begin{cases} [x_c, y_c, z_c] = [x, y, z] - [x_m, y_m, z_m] \\ [x_p, y_p, z_p] = [x, y, z] - [x_g, y_g, z_g] \end{cases}$$

in the formula, ($x_c$, $y_c$, $z_c$) is a deviation of a point of the plurality of points within a pillar of the H×W pillars relative to a pillar central point, ($x_m$, $y_m$, $z_m$) is a pillar central point coordinate, ($x_p$,$y_p$,$z_c$) is a deviation of the point relative to a grid central point, and ($x_g$,$y_g$,$z_g$) is a grid central point coordinate;

each frame of the RaDAR point cloud data forms a tensor of dimensions ($D_p$,N,P), where $D_p$ is dimensions of the point, $D_p$=10, N is a number of points sampled for each of the H×W pillars, N=32, P=H×W; each of the H×W pillars with more than N points is randomly down-sampled, and each of the H×W pillars with less than N points is filled with a 0 value; and the tensor is the pillar features of the RaDAR point cloud data.

12. The terminal device according to claim 11, wherein the method, wherein the RaDAR point cloud data pyramid feature extraction unit is specifically implemented in the following process:

projecting the RaDAR point cloud data onto the x-y plane to form a grid of H×W, thereby dividing point clouds within a pyramid with a vertical angle θ of [−26°, 6°] and a horizontal angle φ of [−90°, 90°] into H×W pyramids, wherein a maximum of N points are randomly sampled within each of the H×W pyramids, and each of the H×W pyramids with less than the N points is filled with 0; and each frame of the RaDAR point cloud data forms a tensor of dimensions ($D_L$,N,P), where $D_L$=4, P is a number of the H×W pyramids H×W, N is a number of the N points within each of the H×W pyramids, N=32, and the tensor is the pyramid features of the RaDAR point cloud data.

13. The terminal device according to claim 12, wherein the method, wherein the feature fusion module is specifically implemented in the following process:

concatenating the pillar features from the LiDAR and the pyramid features from the RaDAR to form a 14-dimensional feature vector $F_L$:

$F_L$=Concat($F_{Lpi}$,$F_{Rpy}$)

where $F_{Lpi}$ are the pillar features from the LiDAR, and $F_{Rpy}$ are the pyramid features from the RaDAR; and Concat represents a feature stitching operation;

concatenating the pillar features from the RaDAR and the pyramid features from the LiDAR to form a 14-dimensional feature vector $F_R$, $F_R$=Concat($F_{Rpi}$,$F_{Lpy}$)

where $F_{Rpi}$ are the pillar features from the RaDAR, and $F_{Lpy}$ are the pyramid features from the LiDAR; and inputting the 14-dimensional feature vector $F_L$ and the 14-dimensional feature vector $F_R$ into the RaDAR and LiDAR feature interaction module, respectively.

14. The terminal device according to claim 13, wherein the method, wherein the RaDAR and LiDAR feature interaction module is specifically implemented in the following process:

expanding the 14-dimensional feature vector $F_L$ into a 64-dimensional feature $F_{L_{64}}$ through an FC layer and a Maxpool layer, and performing a convolution operation to dimensionally reduce the 64-dimensional feature $F_{L_{64}}$ to a 16-dimensional feature $F_{L_{16}}$:

$$F_{L_{64}}=\text{Maxpool}(\text{Linear}(F_L))$$

$$F_{L_{16}}=\text{Conv}(\text{Maxpool}(\text{Linear}(F_{L_{64}})))$$

expanding the 14-dimensional feature vector $F_R$ into a 64-dimensional feature $F_{R_{64}}$ through an FC layer and a Maxpool layer, and performing the convolution operation to dimensionally reduce the 64-dimensional feature $F_{R_{64}}$ to a 16-dimensional feature $F_{R_{16}}$:

$$F_{R_{64}}=\text{Maxpool}(\text{Linear}(F_R))$$

$$F_{R_{16}}=\text{Conv}(\text{Maxpool}(\text{Linear}(F_{R_{64}})))$$

where Conv represents a convolutional layer, Maxpool represents a maximum pooling layer, and Linear represents a fully connected layer;

transposing the 16-dimensional feature $F_{L_{16}}$ and then multiplying the 16-dimensional feature $F_{L_{16}}$ with the 16-dimensional feature $F_{R_{16}}$, and performing a Softmax normalization operation to generate a weight matrix $F_{Lw}$ of a size M×N:

$$F_{Lw}=\text{Sfot max}((F_{L_{16}})^T F_{R_{16}})$$

wherein in the formula, Softmax represents the normalization operation;

transposing the 16-dimensional feature $F_{R_{16}}$, and then multiplying the 16-dimensional feature $F_{R_{16}}$ with the 16-dimensional feature $F_{L_{16}}$, and performing the Softmax normalization operation to generate a weight matrix $F_{Rw}$ of a size N×M:

$$F_{Rw}=\text{SfotMax}((F_{R_{16}})^T F_{L_{16}})$$

multiplying the weight matrix $F_{Rw}$ with the weight matrix $F_{L_{64}}$ to obtain a new 64-dimensional feature vector, subtracting $F_{R_{64}}$ and after processing by a linear layer, a normalization layer and an ReLU activation function, adding $F_{R_{64}}$ thereto, to obtain the RaDAR feature $F_{Rt}$ with the LiDAR interaction information:

$$F_{Rt}=\text{ReLU}(BN(\text{linear}(F_{Rw}F_{L_{64}}-F_{R_{64}})))+F_{R_{64}}$$

where ReLU is the activation function, BN is the normalization layer, and linear is the linear layer;

multiplying the weight matrix $F_{Lw}$ with the feature $F_{R_{64}}$, subtracting $F_{L_{64}}$ therefrom, and after processing by the linear layer, the normalization layer and the activation function ReLU, adding $F_{L_{64}}$ thereto, to obtain the LiDAR feature $F_{Lt}$ with the RaDAR interaction information:

$$F_{Lt}=\text{ReLU}(BN(\text{linear}(F_{Lw}F_{R_{64}}-F_{L_{64}})))+F_{L_{64}}$$

concatenating the features $F_{Rt}$ and $F_{Lt}$ of two modalities by dimensions to accomplish an interaction of the two modalities:

$$F=\text{Concat}(F_{Rt},F_{Lt})$$

wherein in the formula, F is a concatenated feature, and Concat represents a concatenating operation.

15. The terminal device according to claim 8, wherein the method further comprises a step of training a RaDAR and LiDAR fusion network, specifically comprising:

normalizing an Astyx dataset used to a format of a standard KITTI dataset, and aligning the LiDAR point cloud data and a 3D bounding box to a RaDAR coordinate system by using a calibration file to generate a training set; and training the RaDAR and LiDAR fusion network by using the training set to obtain a trained RaDAR and LiDAR fusion network.

16. The non-volatile storage medium according to claim 9, wherein the method, wherein the voxelization module comprises a RaDAR point cloud data pillar feature extraction unit, a LiDAR point cloud data pillar feature extraction unit, a RaDAR point cloud data pyramid feature extraction unit, and a LiDAR point cloud data pyramid feature extraction unit;

the RaDAR point cloud data pillar feature extraction unit comprises two first fully connected layers, a first bird's-eye view and a first maximum pooling layer; the RaDAR point cloud data is dimensionally expanded to 64 dimensions through the one of the two first fully connected layers, and voxelized in the bird's eye view through the first bird's-eye view, and then enters the other of the two first fully connected layers and the first maximum pooling layer to output the pillar features of the RaDAR point cloud data;

the LiDAR point cloud data pillar feature extraction unit comprises two second fully connected layers, a second bird's eye view and a second maximum pooling layer; the LiDAR point cloud data is dimensionally expanded to 64 dimensions through the one of the two second fully connected layers, and voxelized in the bird's eye view through the second bird's eye view, and enters the other of the two second fully connected layers and the second maximum pooling layer to output the pillar features of the LiDAR point cloud data;

the RaDAR point cloud data pyramid feature extraction unit comprises two third fully connected layers, a first perspective view and a third maximum pooling layer; the RaDAR point cloud data is dimensionally expanded to 64 dimensions through the one of the two third fully connected layers, and voxelized in the perspective view through the first perspective view, and enters the other of the two third fully connected layers and the third maximum pooling layer to output the pyramid features of the RaDAR point cloud data; and the LiDAR point cloud data pyramid feature extraction unit comprises two fourth fully connected layers, a second perspective view and a fourth maximum pooling layer; and the LiDAR point cloud data is dimensionally expanded to 64 dimensions through the one of the two fourth fully connected layers, and voxelized in the perspective view through the second perspective view, and then enters the other of the two fourth fully connected layers and the fourth maximum pooling layer to output the pyramid features of the LiDAR point cloud data.

17. The non-volatile storage medium according to claim 16, wherein the method, wherein the RaDAR point cloud data pillar feature extraction unit is specifically implemented in the following process:

projecting the RaDAR point cloud data onto the x-y plane to form a grid of H×W, and dividing the RaDAR point cloud data into H×W pillars of a volume of 0.16×0.16×4, wherein each point of an original 4D RaDAR point cloud has 4 dimensions (x, y, z, r), where (x, y, z) is a 3D coordinate, and r is reflectivity; a plurality of points are within each of the H×W pillars, and each of the plurality of points is expanded to 10 dimensions $(x,y,z,x_c,y_c,z_c,x_p,y_p,z_p, r)$, calculated as:

$$\begin{cases} [x_c, y_c, z_c] = [x, y, z] - [x_m, y_m, z_m] \\ [x_p, y_p, z_p] = [x, y, z] - [x_g, y_g, z_g] \end{cases}$$

in the formula, $(x_c, y_c, z_c)$ is a deviation of a point of the plurality of points within a pillar of the H×W pillars relative to a pillar central point, $(x_m, y_m, z_m)$ is a pillar central point coordinate, $(x_p, y_p, z_p)$ is a deviation of the point relative to a grid central point, and $(x_g, y_g, z_g)$ is a grid central point coordinate;

each frame of the RaDAR point cloud data forms a tensor of dimensions $(D_p, N, P)$, where $D_p$ is dimensions of the point, $D_p=10$, N is a number of points sampled for each of the H×W pillars, N=32, P=H×W; each of the H×W pillars with more than N points is randomly downsampled, and each of the H×W pillars with less than N points is filled with a 0 value; and the tensor is the pillar features of the RaDAR point cloud data.

18. The non-volatile storage medium according to claim 17, wherein the method, wherein the RaDAR point cloud data pyramid feature extraction unit is specifically implemented in the following process:

projecting the RaDAR point cloud data onto the x-y plane to form a grid of H×W, thereby dividing point clouds within a pyramid with a vertical angle θ of [−26°, 6°] and a horizontal angle φ of [−90°, 90°] into H×W pyramids, wherein a maximum of N points are randomly sampled within each of the H×W pyramids, and each of the H×W pyramids with less than the N points is filled with 0; and each frame of the RaDAR point cloud data forms a tensor of dimensions $(D_L, N, P)$, where $D_L=4$, P is a number of the H×W pyramids H×W, N is a number of the N points within each of the H×W pyramids, N=32, and the tensor is the pyramid features of the RaDAR point cloud data.

19. The non-volatile storage medium according to claim 18, wherein the method, wherein the feature fusion module is specifically implemented in the following process:

concatenating the pillar features from the LiDAR and the pyramid features from the RaDAR to form a 14-dimensional feature vector $F_L$:

$F_L=\text{Concat}(F_{Lpi}, F_{Rpy})$ where $F_{Lpi}$ are the pillar features from the LiDAR, and $F_{Rpy}$ are the pyramid features from the RaDAR; and Concat represents a feature stitching operation;

concatenating the pillar features from the RaDAR and the pyramid features from the LiDAR to form a 14-dimensional feature vector $F_R$, $F_R=\text{Concat}(F_{Rpi}, F_{Lpy})$ where $F_{Rpi}$ are the pillar features from the RaDAR, and $F_{Lpy}$ are the pyramid features from the LiDAR; and inputting the 14-dimensional feature vector $F_L$ and the 14-dimensional feature vector $F_R$ into the RaDAR and LiDAR feature interaction module, respectively.

20. The non-volatile storage medium according to claim 19, wherein the method, the RaDAR and LiDAR feature interaction module is specifically implemented in the following process:

expanding the 14-dimensional feature vector $F_L$ into a 64-dimensional feature $F_{L_{64}}$ through an FC layer and a Maxpool layer, and performing a convolution operation to dimensionally reduce the 64-dimensional feature $F_{L_{64}}$ to a 16-dimensional feature $F_{L_{16}}$:

$F_{L_{64}}=\text{Maxpool}(\text{Linear}(F_L))$ $F_{L_{16}}=\text{Conv}(\text{Maxpool}(\text{Linear}(F_{L_{64}})))$ expanding the 14-dimensional feature vector $F_R$ into a 64-dimensional feature $F_{R_{64}}$ through an FC layer and a Maxpool layer, and performing the convolution operation to dimensionally reduce the 64-dimensional feature $F_{R_{64}}$ to a 16-dimensional feature $F_{R_{16}}$:

$F_{R_{64}}=\text{Maxpool}(\text{Linear}(F_R))$ $F_{R_{16}}=\text{Conv}(\text{Maxpool}(\text{Linear}(F_{R_{64}})))$ where Conv represents a convolutional layer, Maxpool represents a maximum pooling layer, and Linear represents a fully connected layer;

transposing the 16-dimensional feature $F_{L_{16}}$ and then multiplying the 16-dimensional feature $F_{L_{16}}$ with the 16-dimensional feature $F_{R_{16}}$, and performing a Softmax normalization operation to generate a weight matrix $F_{Lw}$ of a size M×N:

$F_{Lw}=\text{Sfot max}((F_{L_{16}})^T F_{R_{16}})$ wherein in the formula, Softmax represents the normalization operation;

transposing the 16-dimensional feature $F_{R_{16}}$ and then multiplying the 16-dimensional feature $F_{R_{16}}$ with the 16-dimensional feature $F_{L_{16}}$, and performing the Softmax normalization operation to generate a weight matrix $F_{Rw}$ of a size N×M:

$F_{Rw}=\text{Sfotmax}((F_{R_{16}})^T F_{L_{16}})$ multiplying the weight matrix $F_{Rw}$ with the weight matrix $F_{L_{64}}$ to obtain a new 64-dimensional feature vector, subtracting $F_{R_{64}}$ and after processing by a linear layer, a normalization layer and an ReLU activation function, adding $F_{R_{64}}$ thereto, to obtain the RaDAR feature $F_{Rt}$ with the LiDAR interaction information:

$F_{Rt}=\text{ReLU}(BN(\text{linear}(F_{Rw} F_{L_{64}} - F_{R_{64}}))) + F_{R_{64}}$ where ReLU is the activation function, BN is the normalization layer, and linear is the linear layer;

multiplying the weight matrix $F_{Lw}$ with the feature $F_{R_{64}}$, subtracting $F_{L_{64}}$ therefrom, and after processing by the linear layer, the normalization layer and the activation function ReLU, adding $F_{L_{64}}$ thereto, to obtain the LiDAR feature $F_{Lt}$ with the RaDAR interaction information:

$F_{Lt}=\text{ReLU}(BN(\text{linear}(F_{Lw} F_{R_{64}} - F_{L_{64}}))) + F_{L_{64}}$ concatenating the features $F_{Rt}$ and $F_{Lt}$ of two modalities by dimensions to accomplish an interaction of the two modalities:

$F=\text{Concat}(F_{Rt}, F_{Lt})$ wherein in the formula, F is a concatenated feature, and Concat represents a concatenating operation.

* * * * *